July 2, 1946.  M. C. RAWSON  2,403,193
DISINTEGRATING HEAD
Filed Feb. 10, 1944

INVENTOR.
Maxwell C. Rawson,
BY
Cromwell, Greist & Warden
Attys

// Patented July 2, 1946

UNITED STATES PATENT OFFICE 2,403,193

DISINTEGRATING HEAD

Maxwell C. Rawson, Des Plaines, Ill.

Application February 10, 1944, Serial No. 521,805

4 Claims. (Cl. 146—89)

The object of this invention is to provide an improved disintegrating head which is capable of reducing various materials into powder, flake or granular form of any desired fineness, at a high rate of speed, and without clogging of the head. The new head will operate with equal efficacy on such widely divergent materials as leather, rubber, wood, soap, gelatine, resins and gums.

While the foregoing statements are indicative in a general way of the nature of the invention, other more specific objects and advantages will be apparent to those skilled in the art upon a full understanding of the novel construction of the improved disintegrating head.

A preferred embodiment of the invention is presented herein for the purpose of exemplification, but it will of course be appreciated that the invention is susceptible of incorporation in other structurally modified forms coming equally within the scope of the appended claims.

Figure 1:
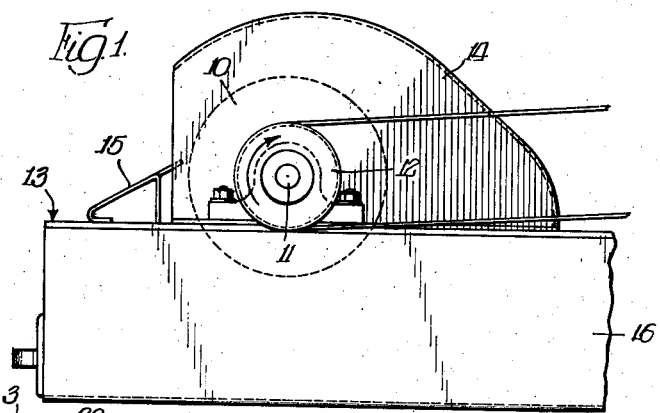
Fig. 1 is a fragmentary side view of a machine equipped with a disintegrating head constructed in accordance with the invention.

The machine shown in Fig. 1 of the drawing includes a disintegrating head 10 which is mounted on a shaft 11 and is rotated by a pulley 12 on one end of the shaft. The shaft 11 is journaled in suitable bearings in a housing 13 which is shaped to provide a hood 14 for the head. The material which is to be reduced is fed toward the head 10 on an inclined work support 15 at the front end of the machine, and the resulting finely divided particles are directed by the hood 14 into a compartment 16 in the base of the machine.

Figure 2:
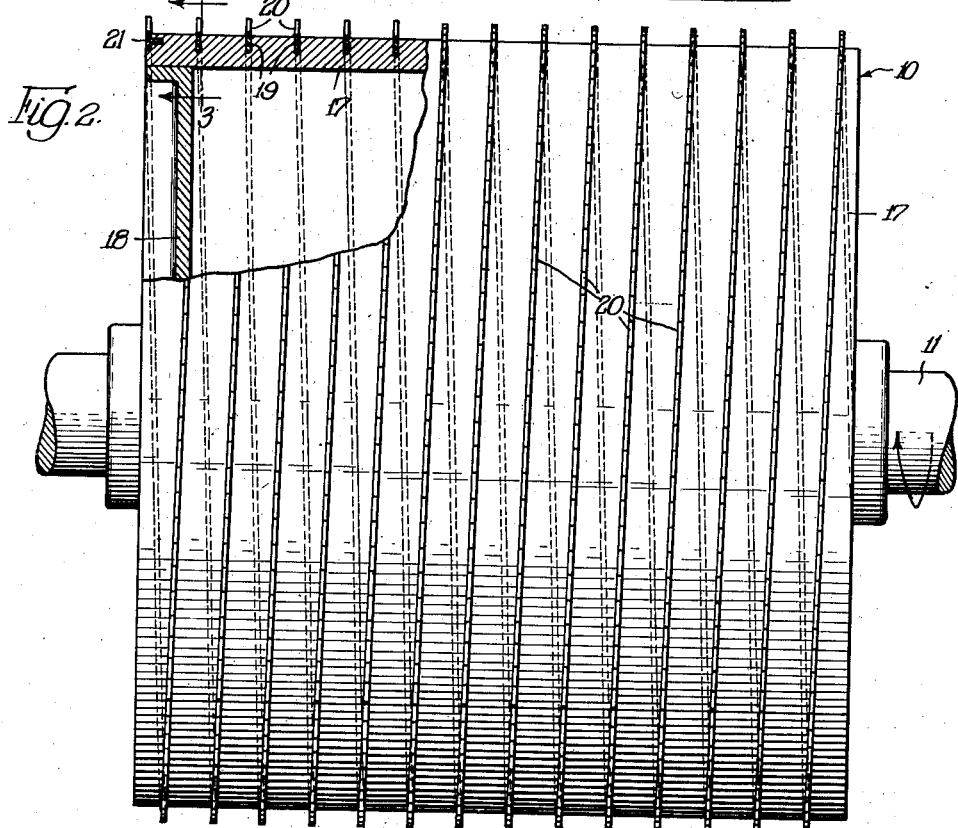
Fig. 2 is a partially sectioned face view of the head.

The invention resides primarily in the novel construction of the cutting surface of the head 10. The head 10—which is shown in detail in Fig. 2—consists of a metal cylinder 17 which is supported concentrically of the shaft 11 on end disks 18. The outer surface of the cylinder 17 is provided with a helical groove 19 of rectangular cross section which extends continuously in a large number of closely spaced turns from one end of the cylinder to the other. The groove 19 contains a snugly fitting saw blade 20 which is curved edgewise to conform to the curvature of the groove and is connected at its ends to the ends of the cylinder by screws 21 or other fastening means.

Figure 3:
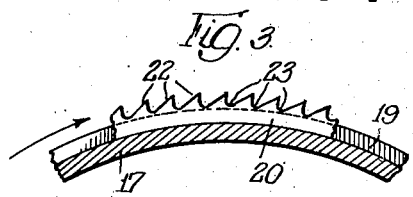
Fig. 3 is a fragmentary section taken on the line 3—3 of Fig. 2.

The blade 20 projects outwardly from the outer periphery of the cylinder 17 and is characterized by teeth 22 and intervening gullets 23. The teeth are preferably directed in the intended direction of rotation of the cylinder 17, and the gullets are preferably elevated a little above the outer periphery of the cylinder, all as shown in Fig. 3. While the size and design of the teeth and gullets, and the lateral spacing of the convolutions of the blade, can be varied considerably, excellent results have been obtained by using a blade which is about 1/4 inch in height and about 3/32 inch in thickness, and by employing teeth which are spaced apart about 1/5 inch and gullets which extend to a depth of about 1/8 inch, seating the band in a groove which is about 1/8 inch deep.

A disintegrating head constructed in accordance with the present invention will reduce the material acted upon to any desired degree of fineness, depending upon the rate of speed at which the material is fed to the head and also the rate of speed of the head. The cutting surface of the head will not clog, and the fine particles produced will be thrown free of the head into the receptacle provided for the receipt of the same.

I claim:

1. A disintegrating head, comprising a cylinder provided in its outer periphery with a helical groove which extends continuously from one end of the cylinder to the other in a large number of closely arranged convolutions, and a saw blade positioned in the groove with the teeth of the blade projecting outwardly from the surface of the cylinder and with the bottoms of the gullets between the teeth disposed closely adjacent said surface, said blade being curved edgewise in conformity with the curvature of the groove and being secured at its ends to the ends of the cylinder.

2. A disintegrating head, comprising a cylinder provided in its outer periphery with a helical groove which extends continuously from one end of the cylinder to the other in a large number of closely arranged convolutions, and a saw blade positioned in the groove with the teeth of the blade projecting outwardly from the surface of the cylinder, said blade being curved edgewise in conformity with the curvature of the groove and being secured at its ends to the ends of the cylinder, the teeth of the blade being directed in the direction of rotation of the cylinder, and the bottoms of the gullets between the teeth being disposed ouwardly of but closely adjacent the outer periphery of the cylinder.

3. In a reduction machine, a rotatable disintegrating head having a cutting surface formed by a series of teeth arranged in helically disposed convolutions with the teeth directed in the direction of rotation, and a support across which the material to be reduced is adapted to be advanced into engagement with the head, said support being directed toward the head at an obtuse angle to the surface of the latter in the direction in which the surface is moving.

4. In a reduction machine, a rotatable disintegrating head having a cutting surface formed by a series of teeth arranged in helically disposed convolutions with the teeth directed in the direction of rotation, a support across which the material to be reduced is adapted to be advanced into engagement with the head, said support being directed toward the head at an obtuse angle to the surface of the latter in the direction in which the surface is moving, a hood about the head beyond the support, and a collecting chamber beneath the head beyond the hood.

MAXWELL C. RAWSON.